(12) United States Patent
Tsuda et al.

(10) Patent No.: US 10,896,015 B2
(45) Date of Patent: Jan. 19, 2021

(54) PRINT JOB TRANSMITTING APPARATUS, PRINT SYSTEM

(71) Applicant: KYOCERA Document Solutions Inc., Osaka (JP)

(72) Inventors: Keiji Tsuda, Osaka (JP); Masafumi Sato, Osaka (JP); Tatsuya Hiwatari, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/567,571

(22) Filed: Sep. 11, 2019

(65) Prior Publication Data
US 2020/0089453 A1 Mar. 19, 2020

(30) Foreign Application Priority Data

Sep. 13, 2018 (JP) .................................. 2018-171563

(51) Int. Cl.
*G06F 3/12* (2006.01)
(52) U.S. Cl.
CPC .......... *G06F 3/1289* (2013.01); *G06F 3/1203* (2013.01); *G06F 3/1268* (2013.01)
(58) Field of Classification Search
USPC ............... 358/1.1–3.29, 1.11–1.18; 399/8–19
See application file for complete search history.

(56) References Cited

U.S. PATENT DOCUMENTS

| 8,370,434 | B2* | 2/2013 | Yoon ...................... G06Q 10/06 709/205 |
| 2006/0031906 | A1 | 2/2006 | Kaneda |
| 2006/0192999 | A1* | 8/2006 | Kawai ................... G06F 3/1204 358/1.15 |
| 2012/0033256 | A1* | 2/2012 | Kawajiri ............... G06F 3/1204 358/1.15 |
| 2013/0335785 | A1* | 12/2013 | Qi .......................... H04L 67/125 358/3.28 |
| 2016/0255215 | A1* | 9/2016 | Oguma .............. H04N 1/00856 358/1.13 |
| 2018/0220025 | A1* | 8/2018 | Morimoto ............... G06F 3/123 |

FOREIGN PATENT DOCUMENTS

| JP | 2005222161 A | 8/2005 |
| JP | 200650465 A | 2/2006 |
| JP | 2008021233 A | 1/2008 |

* cited by examiner

*Primary Examiner* — Marcellus J Augustin
(74) *Attorney, Agent, or Firm* — Alleman Hall Creasman & Tuttle LLP

(57) ABSTRACT

A print job transmitting apparatus includes a device communication portion configured to communicate with an image forming apparatus for executing a print job, and a server communication portion configured to communicate with a server for managing information relating to the image forming apparatus. The device communication portion, in addition to transmitting the print job to the image forming apparatus, obtains, from the image forming apparatus, the information relating to the image forming apparatus. The server communication portion transmits, to the server, the information obtained by the device communication portion.

4 Claims, 7 Drawing Sheets

PRINT JOB TRANSMITTING APPARATUS, PRINT SYSTEM

INCORPORATION BY REFERENCE

This application is based upon and claims the benefit of priority from the corresponding Japanese Patent Application No. 2018-171563 filed on Sep. 13, 2018, the entire contents of which are incorporated herein by reference.

BACKGROUND

The present disclosure relates to a print job transmitting apparatus for transmitting a print job to an image forming apparatus, and a print system including the print job transmitting apparatus.

Conventionally, there is known a technology in which an image forming apparatus transmits, to a server via a network, counter information indicating the number of sheets printed by the image forming apparatus, and alert information indicating an alert such as, for example, a paper jam in the image forming apparatus, and in this way, the number of sheets printed by the image forming apparatus and the alert information of the image forming apparatus is managed by the server.

SUMMARY

A print job transmitting apparatus according to an aspect of the present disclosure includes a device communication portion configured to communicate with an image forming apparatus for executing a print job, and a server communication portion configured to communicate with a server for managing information relating to the image forming apparatus, wherein the device communication portion, in addition to transmitting the print job to the image forming apparatus, obtains, from the image forming apparatus, the information relating to the image forming apparatus, and the server communication portion transmits, to the server, the information obtained by the device communication portion.

The configuration described above allows for the server to manage information relating to the image forming apparatus, even if the image forming apparatus and the server cannot communicate with one another.

A print system according to another aspect of the present disclosure includes the image forming apparatus, the print job transmitting apparatus, and the server.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings.

First, a configuration of a print system according to an embodiment of the present disclosure is described.

Figure 1:
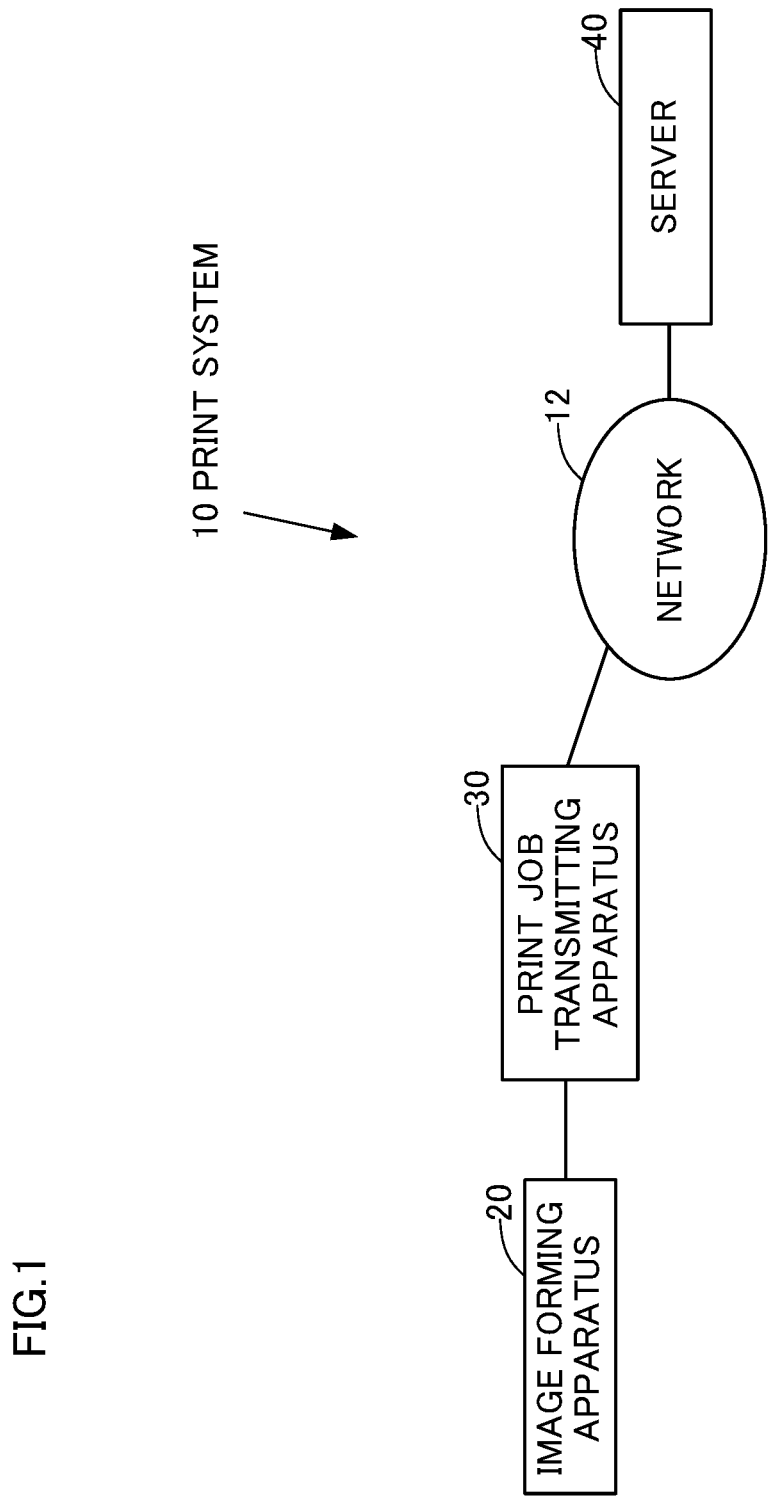
FIG. 1 is a block diagram of a print system according to an embodiment of the present disclosure.

FIG. 1 is a block diagram showing a print system 10 according to an embodiment of the present disclosure.

The print system 10 includes one or more image forming apparatuses 20. FIG. 1 shows an example of the print system 10 including one image forming apparatus 20. The print system 10 may include multiple image forming apparatuses 20. The image forming apparatus 20 is configured by, for example, an MFP (multifunction peripheral) or a machine that is exclusively for printing.

The print system 10 includes one or more print job transmitting apparatuses 30. The print job transmitting apparatus 30 is configured to transmit a print job to the image forming apparatus 20 of the print system 10. FIG. 1 shows an example of the print system 10 including one print job transmitting apparatus 30. The print system 10 may include multiple print job transmitting apparatuses 30. The print job transmitting apparatus 30 is configured by, for example, a computer such as a PC (personal computer).

The print system 10 includes a server 40 for managing information relating to the image forming apparatus 20 of the print system 10. The server 40 may be configured by one or more computers.

The image forming apparatus 20 of the print system 10 and the print job transmitting apparatus 30 of the print system 10 communicate with one another via a cable 11 such as a USB (universal serial bus) cable.

The image forming apparatus 20 of the print system 10 and the server 40 are not configured to directly communicate with one another.

The print job transmitting apparatus 30 of the print system 10 and the server 40 communicate with one another via a network 12 such as a LAN (local area network).

Figure 2:
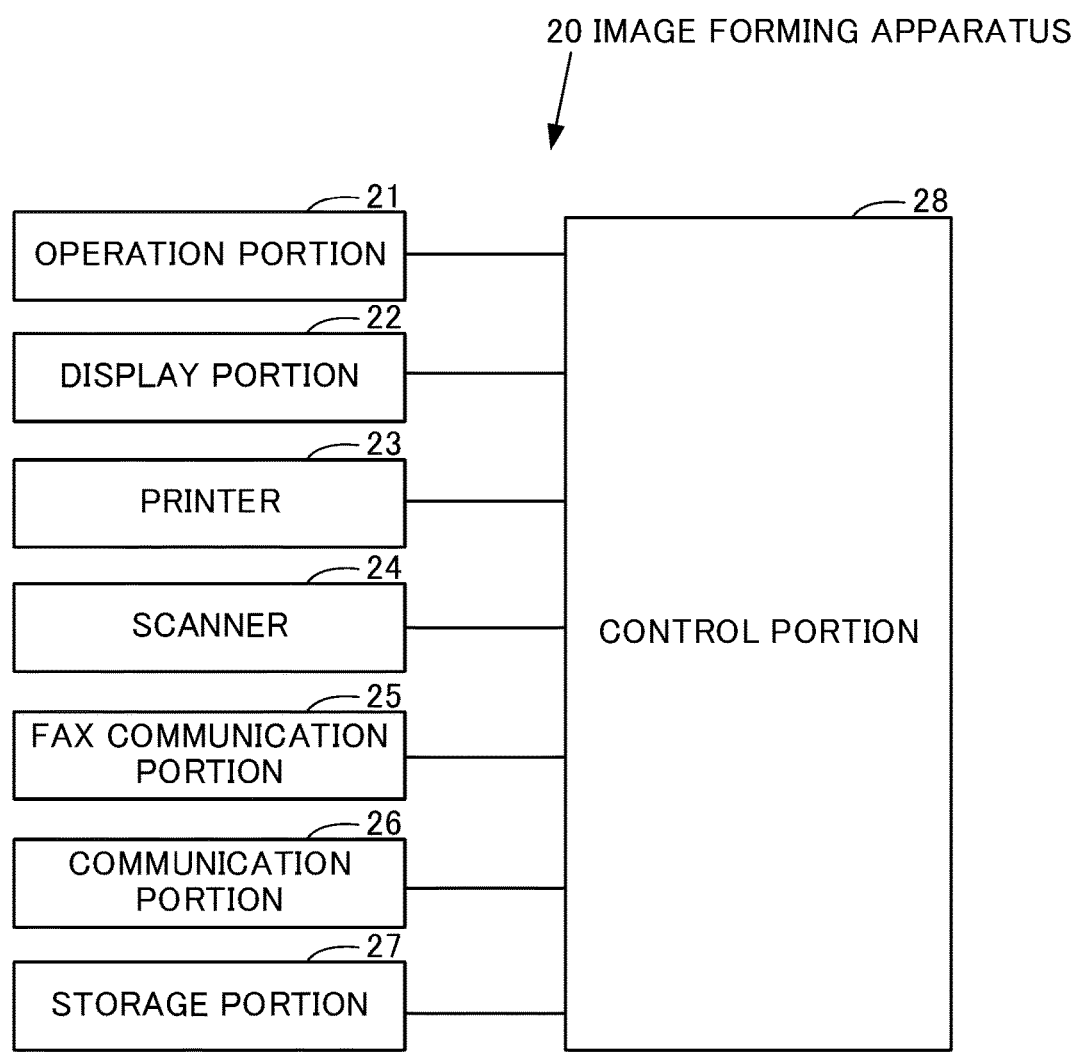
FIG. 2 is a block diagram of an image forming apparatus shown in FIG. 1, in a case where the image forming apparatus is an MFP.

FIG. 2 is a block diagram showing a case where the image forming apparatus 20 is an MFP.

The image forming apparatus 20 in FIG. 2 includes an operation portion 21, a display portion 22, a printer 23, a scanner 24, a fax communication portion 25, a communication portion 26, a storage portion 27, and a control portion 28.

The operation portion 21 is an operation device such as a set of buttons for inputting various operations. The display portion 22 is a display device such as an LCD (liquid crystal display) for displaying various types of information.

The printer 23 is a printing device for printing an image on a recording medium such as a sheet of paper. The scanner 24 is a reading device for reading an image from a document sheet.

The fax communication portion 25 is a fax device for performing fax communication, with an external facsimile device (not shown), via a communication line such as a dial-up line (not shown).

The communication portion 26 is a communication device for communicating, with an external device, indirectly via a network such as a LAN or the internet, or directly by wired or wireless communication that is not performed via the network. The storage portion 27 is a non-volatile storage device such as a semiconductor memory or an HDD (hard disk drive) for storing various types of information. The control portion 28 is a device for integrally controlling the image forming apparatus 20.

The control portion 28 includes, for example, a first CPU (central processing unit), a first ROM (read only memory), and a first RAM (random access memory). The first ROM stores a program and various types of data. The first RAM is a memory used as a work area for the first CPU. The first CPU executes the program stored in the storage portion 27 or the first ROM.

Figure 3:
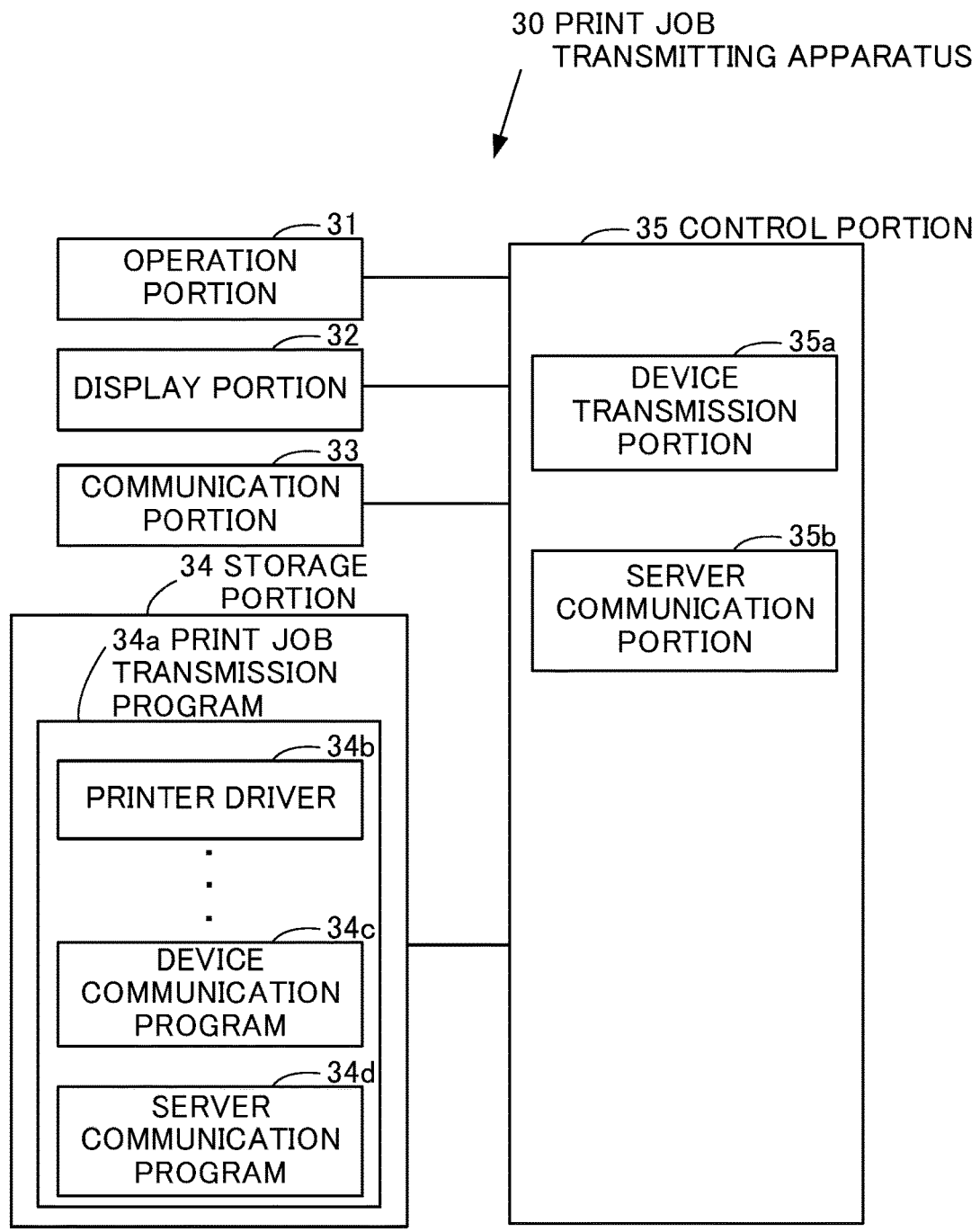
FIG. 3 is a block diagram of a print job transmitting apparatus shown in FIG. 1.

FIG. 3 is a block diagram showing the print job transmitting apparatus 30.

The print job transmitting apparatus 30 shown in FIG. 3 includes an operation portion 31, a display portion 32, a communication portion 33, a storage portion 34, and a control portion 35. The operation portion 31 is an operation device such as a keyboard or a mouse for inputting various types of information. The display portion 32 is a display device such as an LCD for displaying various types of information.

The communication portion 33 is a communication device for communicating, with an external device, indirectly via the network 12 such as a LAN or the internet, or directly by wired or wireless communication that is not performed via the network 12.

The storage portion 34 is a non-volatile storage device such as a semiconductor memory or an HDD (hard disk drive) for storing various types of information. The control portion 35 is a device for integrally controlling the print job transmitting apparatus 30.

The storage portion 34 is stored with a print job transmission program 34a for transmitting the print job to the image forming apparatus 20 of the print system 10. The print job transmission program 34a includes a printer driver 34b for a specific model of the image forming apparatus 20 of the print system 10.

Other than the printer driver 34b, the print job transmission program 34a includes other printer drivers for each model of the image forming apparatus 20 of the print system 10.

The print job transmission program 34a further includes a device communication program 34c and a server communication program 34d. The device communication program 34c is for communicating with the image forming apparatus 20 of the print system 10. The server communication program 34d is for communicating with the server 40.

The print job transmission program 34a is, for example, installed to the print job transmitting apparatus 30 during manufacturing of the print job transmitting apparatus 30. In addition, the print job transmission program 34a may be installed additionally to the print job transmitting apparatus 30 from an external storage medium such as a CD (compact disk), a DVD (digital versatile disk), or a USB memory. In addition, the print job transmission program 34a may be installed additionally to the print job transmitting apparatus 30 from another apparatus in the network 12.

It is noted that the UI (user interface) of the printer driver 34b in the print job transmission program 34a is configured to receive, via the operation portion 31, a setting of whether or not to execute, with respect to the image forming apparatus 20 of a model corresponding to the printer driver 34b, a predetermined information transmission process.

The information transmission process is for obtaining, from the image forming apparatus 20 of the print system 10, device information and user session information, and transmitting the information to the server 40.

Here, the device information is information relating to the image forming apparatus 20. The device information includes a serial number of the image forming apparatus 20, alert information in the image forming apparatus 20, and toner and first counter information of the image forming apparatus 20.

The alert information indicates, for example, an alert such as a paper jam alert. The first counter information indicates the number of sheets printed in the image forming apparatus 20 immediately after execution of a target job ends. The target job is the print job that is executed by the image forming apparatus 20.

In addition, the user session information indicates which user of the image forming apparatus 20 has commanded the transmission of the target job.

The user session information includes the user name, the serial number and model name of the image forming apparatus 20 that is the transmission destination of the target job, the job name of the target job, the transmission time, and second counter information.

The user name represents the user that is logged into the print job transmitting apparatus 30. The transmission time is the time when the target job was transmitted to the image forming apparatus 20. The second counter information indicates the number of pages printed in the image forming apparatus 20 immediately before execution of the target job begins.

The control portion 35, for example, includes a second CPU, a second ROM, and a second RAM. The second ROM stores a program and various types of data. The second RAM is a memory used as a work area for the second CPU. The second CPU executes the program that is stored in the storage portion 34 or the second ROM.

The control portion 35 functions as a device communication portion 35a by executing the device communication program 34c. The device communication portion 35a communicates with the image forming apparatus 20 of the print system 10. Furthermore, the control portion 35 functions as a server communication portion 35b by executing the server communication program 34d. The server communication portion 35b communicates with the server 40.

Figure 4:
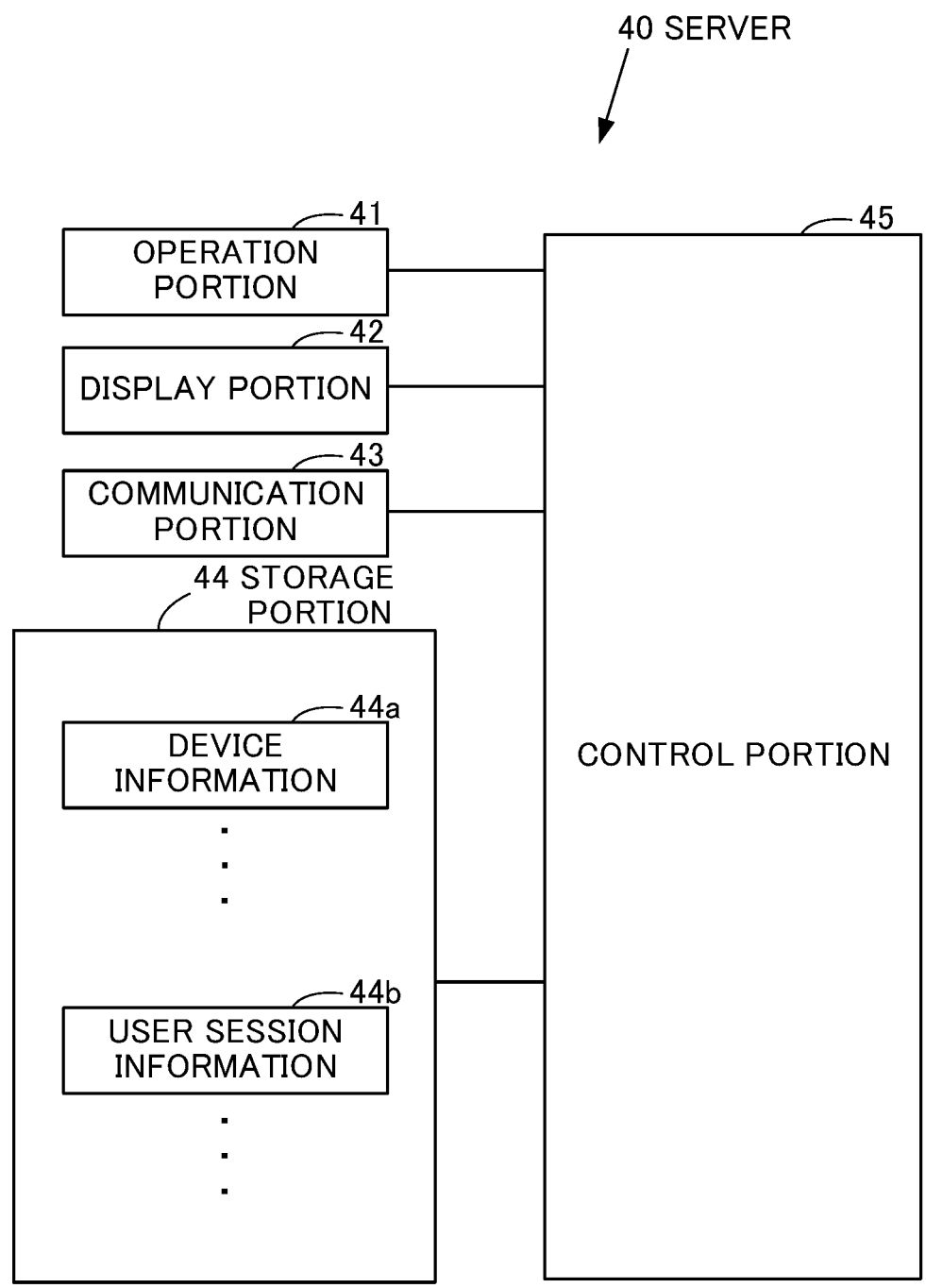
FIG. 4 is a block diagram of a server, in a case where the server shown in FIG. 1 is configured by one computer.

FIG. 4 is a block diagram showing a case where the server 40 is configured by one computer.

The server 40 shown in FIG. 4 includes an operation portion 41, a display portion 42, a communication portion 43, a storage portion 44, and a control portion 45. The operation portion 41 is an operation device such as a keyboard or a mouse for inputting various types of information. The display portion 42 is a display device such as an LCD for displaying various types of information.

The communication portion 43 is a communication device for communicating, with an external device, indirectly via the network 12 such as a LAN or the internet, or directly by wired or wireless communication that is not performed via the network 12.

The storage portion 44 is a non-volatile storage device such as a semiconductor memory or an HDD (hard disk drive) for storing various types of information. The control portion 45 is a device for integrally controlling the server 40.

The storage portion 44 is capable of storing device information 44a of a specific image forming apparatus 20. The storage portion 44 is capable of storing the device information 44a for each of multiple image forming apparatuses 20.

The storage portion 44 is capable of storing user session information 44b for a specific user. The storage portion 44 is capable of storing the user session information 44b for each of a plurality of users.

The control portion 45, for example, includes a third CPU, a third ROM, and a third RAM. The third ROM stores a program and various types of data. The third RAM is a memory used as a work area for the third CPU. The third CPU executes the program that is stored in the storage portion 44 or the third ROM.

Next, an operation performed by the print system 10 is described.

First, a description is given of an operation performed by the print job transmitting apparatus 30 in a case where the print job transmitting apparatus 30 transmits the print job to the image forming apparatus 20.

Figure 5:
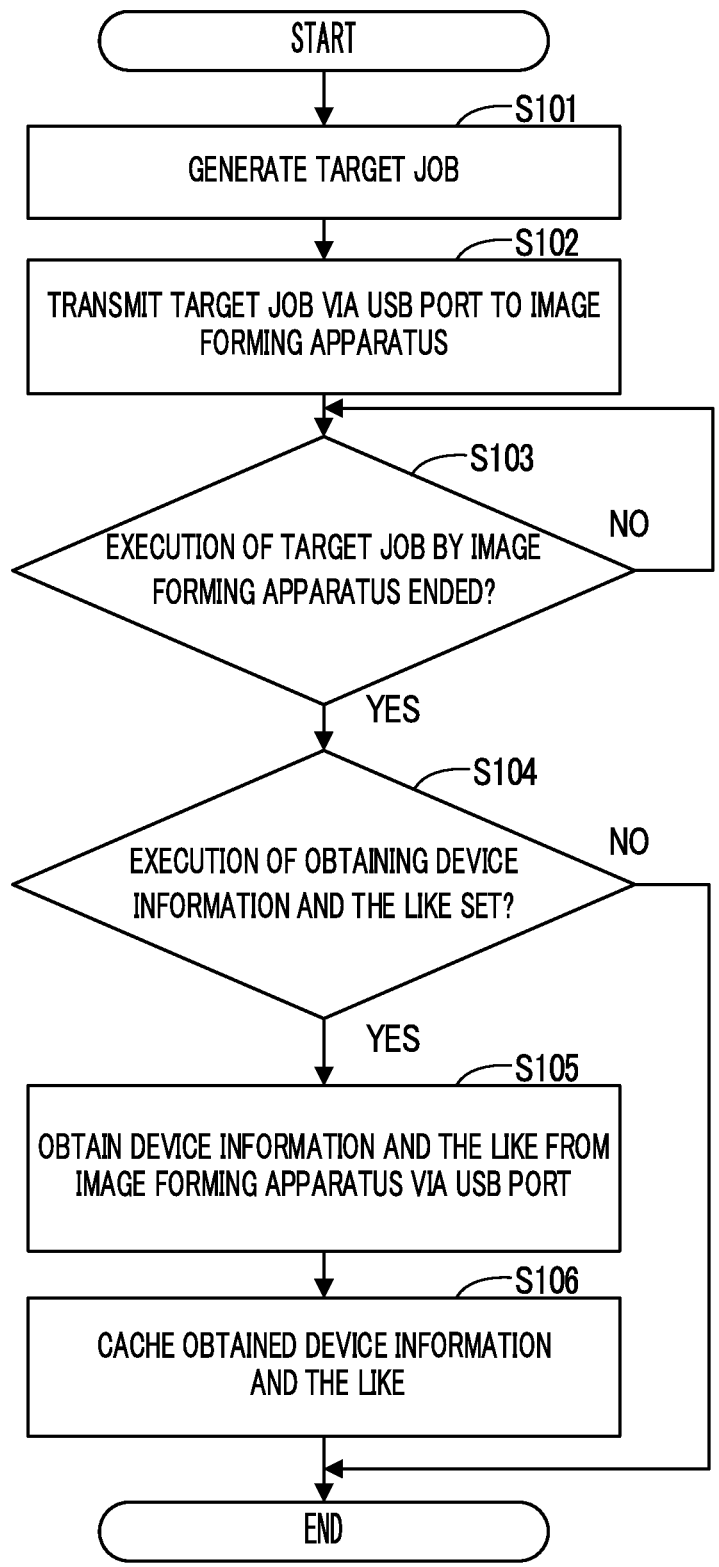
FIG. 5 is a flowchart showing an example procedure of an operation performed by the print job transmitting apparatus in a case where the print job transmitting apparatus shown in FIG. 3 transmits the print job to the image forming apparatus.

FIG. 5 is a flowchart of an example procedure of the operation performed by the print job transmitting apparatus 30 in the case where the print job transmitting apparatus 30 transmits the print job to the image forming apparatus 20.

When a command operation for transmitting the print job to the image forming apparatus 20 is performed on the operation portion 31, the control portion 35 of the print job transmitting apparatus 30 executes the operation shown in FIG. 5.

As shown in FIG. 5, the control portion 35 uses the printer driver 34b that is stored in the storage portion 34 and corresponds to the image forming apparatus 20 to generate the target job (step S101).

Next, the device communication portion 35a transmits the target job to the image forming apparatus 20 via a USB port (step S102). This allows for the control portion 28 of the image forming apparatus 20 to cause the printer 23 to execute the target job that has been transmitted from the print job transmitting apparatus 30.

After the processing in step S102, the device communication portion 35a determines whether or not execution of the target job by the image forming apparatus 20 has ended, until the execution of the target job by the image forming apparatus 20 is determined to have ended (step S103).

When it is determined in step S103 that the execution of the target job by the image forming apparatus 20 has ended, the device communication portion 35a determines whether or not the information transmission process has been set to be executed, with respect to an image forming apparatus of the same model as the image forming apparatus 20 (step S104).

As described above, the information transmission process is for obtaining, from the image forming apparatus 20 of the print system 10, device information and user session information, and transmitting the information to the server 40.

When it is determined in step S104 that the information transmission process has not been set for execution, the device communication portion 35a ends the operation shown in FIG. 5.

When it is determined in step S104 that the information transmission process has been set for execution, the device communication portion 35a uses a PJL (printer job language) command to obtain, from the image forming apparatus 20 via the USB port, the device information and user session information (step S105).

After the processing in step S105, the server communication portion 35b caches the device information and user session information obtained in step S105 (step S106). Then, the server communication portion 35b ends the operation shown in FIG. 5.

Hereinafter, the device information and user session information cached by the server communication portion 35b in step S106 is referred to as cache information.

Next, a description is given of an operation performed by the print job transmitting apparatus 30 in a case where the print job transmitting apparatus 30 transmits the device information and user session information to the server 40.

Figure 6:
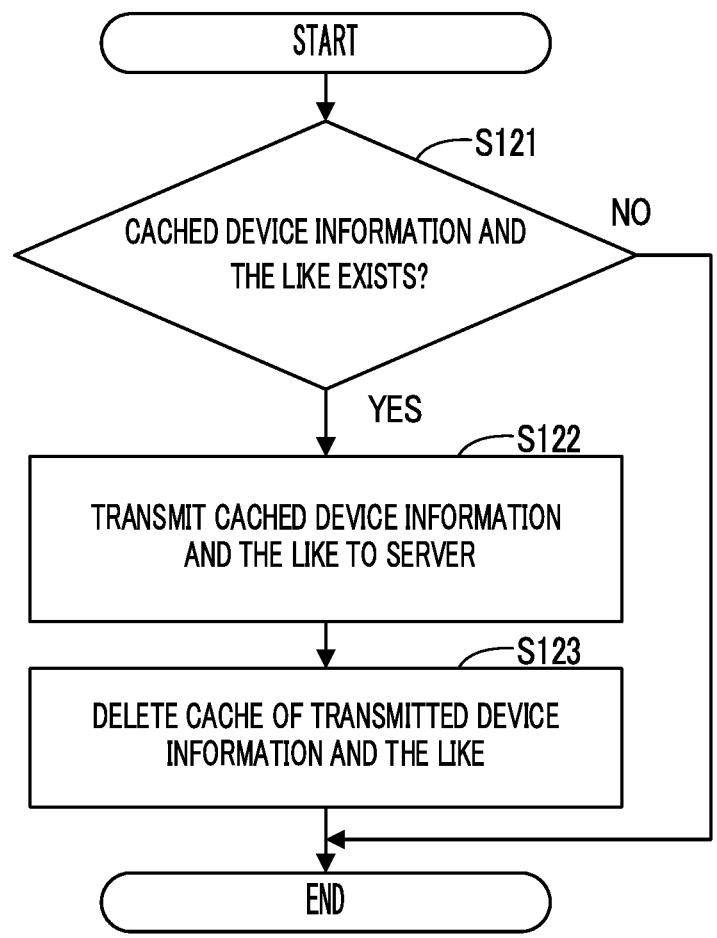
FIG. 6 is a flowchart showing an example procedure of an operation performed by the print job transmitting apparatus in a case where the print job transmitting apparatus shown in FIG. 3 transmits device information and user session information to the server.

FIG. 6 is a flowchart showing an example procedure of the operation performed by the print job transmitting apparatus 30 in the case where the print job transmitting apparatus 30 transmits the device information and user session information to the server 40.

The control portion 35 of the print job transmitting apparatus 30 executes the operation shown in FIG. 6 every time a predetermined period of time elapses.

As shown in FIG. 6, the server communication portion 35b determines whether or not the cache information exists (step S121).

When it is determined in step S121 that the cache information does not exist, the server communication portion 35b ends the operation shown in FIG. 6.

When it is determined in step S121 that the cache information exists, the server communication portion 35b uses, for example, REST API to transmit, to the server 40, a request including the cache information (step S122). This allows for the control portion 45 of the server 40 to store, to the storage portion 44, the device information and user session information included in the request received in step S122, and manage the information.

Figure 7:
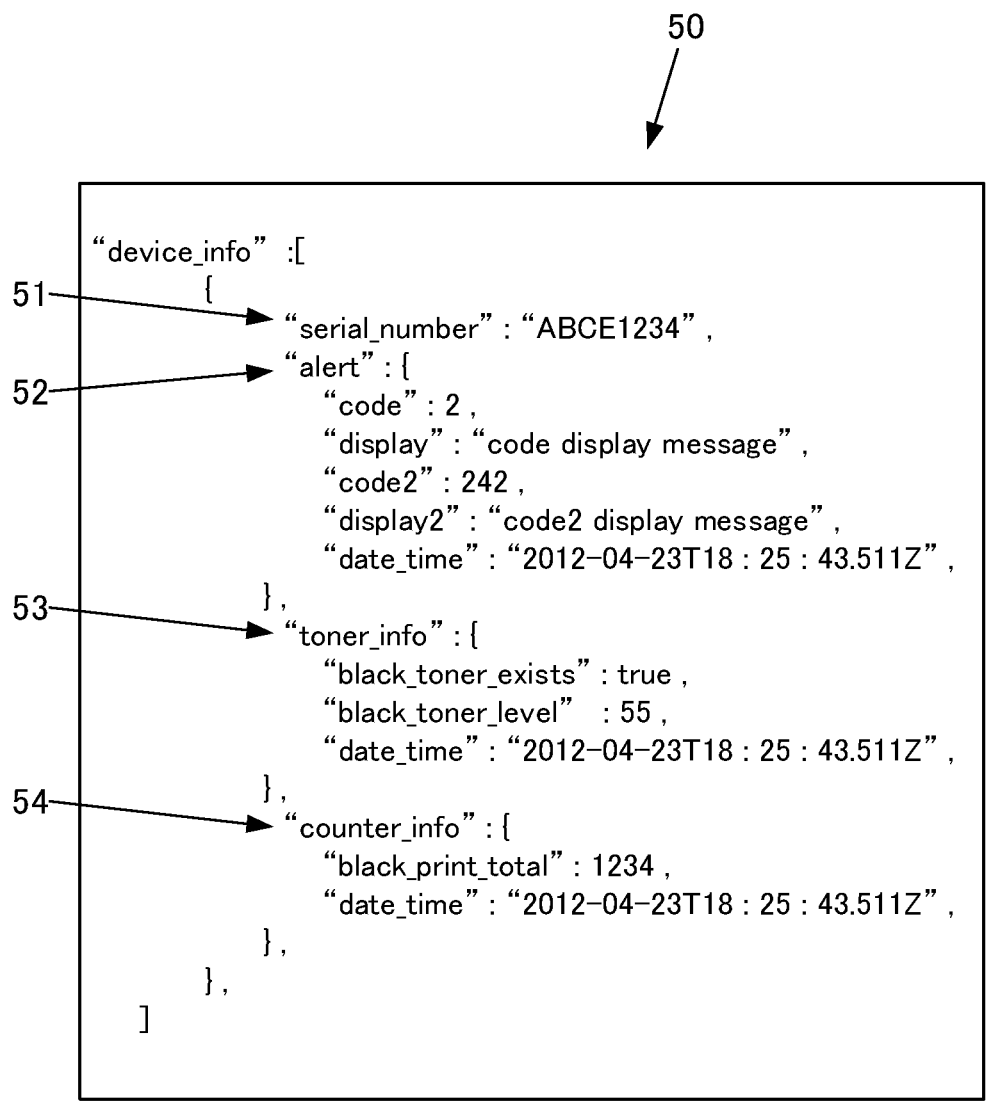
FIG. 7 is a diagram showing example content of a request of the device information that is transmitted to the server from the print job transmitting apparatus shown in FIG. 3.

FIG. 7 shows an example of a request 50 including the device information sent from the print job transmitting apparatus 30 to the server 40 in step S122.

The request 50 shown in FIG. 7 includes alert information 52 in the image forming apparatus 20, toner information 53 of the image forming apparatus 20, and counter information 54 of the image forming apparatus 20 immediately after execution of the target job ends. The counter information 54 is the same as the first counter information.

In the example shown in FIG. 7, the serial number 51 is "ABCE1234".

In the example shown in FIG. 7, the alert information 52 includes an alert of a code "2", a message relating to the code "2" alert that is displayed on the display portion 42 of the server 40, an alert of a code "242", a message relating to the code "242" alert that is displayed on the display portion 42 of the server 40, and a value "2012-04-23T18:25:43.511Z" indicating a date and time when the print job transmitting apparatus 30 obtained the alerts described above.

It is noted that in the example shown in FIG. 7, "code display message" is shown as the message relating to the code "2" alert that is displayed on the display portion 42 of the server 40. However, in actuality, for example, a detailed message relating to the code "2" alert, such as "There is no toner." or "There is no paper.", is included in the alert information 52.

Similarly, in the example shown in FIG. 7, "code2 display message" is shown as the message relating to the code "242" alert that is displayed on the display portion 42 of the server 40. However, in actuality, for example, a detailed message relating to the code "242" alert is included in the alert information 52.

In the example shown in FIG. 7, the toner information 53 includes a value "true" indicating that black toner exists, a value "55" indicating the amount of black toner remaining, and the value "2012-04-23T18:25:43.511Z" indicating the data and time that the print job transmitting apparatus 30 obtained the values described above.

In the example shown in FIG. 7, the toner information 53 does not include information relating to color toner. However, in a case where the image forming apparatus 20 is configured to perform color printing, the toner information 53 includes information relating to color toner.

In the example shown in FIG. 7, the counter information 54 includes a value "1234" indicating the number of sheets printed in black, and the value "2012-04-23T18:25:43.511Z" indicating the date and time that the print job transmitting apparatus 30 obtained the number of sheets printed in black.

In the example shown in FIG. 7, the counter information 54 does not include a value indicating the number of sheets printed in color. However, in a case where the image forming apparatus 20 is configured to perform color printing, the counter information 54 includes information relating to the number of sheets printed in color.

It is noted that the request 50 always includes the serial number 51, the alert information 52, the toner information 53, and the counter information 54. For example, when no alert is generated in the image forming apparatus 20, the request 50 includes alert information 52 having no content.

As shown in FIG. 6, after the processing in step S122, the server communication portion 35b deletes the cache information including the device information and user session information that were transmitted in step S122 (step S123). Then, the server communication portion 35b ends the operation shown in FIG. 6.

As described above, the print job transmitting apparatus 30, in addition to transmitting the print job to the image forming apparatus 20 (step S102), obtains the device information of the image forming apparatus 20 from the image forming apparatus 20 (step S105).

Furthermore, the print job transmitting apparatus 30 transmits, to the server 40, the device information obtained in step S105 (step S122). This allows for the server 40 to manage the device information of the image forming apparatus 20, even when the image forming apparatus 20 cannot communicate with the server 40.

Accordingly, a manager of the image forming apparatus 20 of the print system 10 can check the device information of multiple image forming apparatuses 20 of the print system 10 by simply accessing the server 40.

It is noted that conventional technology has an issue that it is necessary for the image forming apparatus 20 and the server 40 to be capable of directly communicating with one another via the network 12.

On the other hand, according to the present embodiment, even if the image forming apparatus 20 and the server 40 cannot directly communicate with one another, the server 40 can manage information relating to the image forming apparatus 20.

The print job transmitting apparatus 30 transmits the print job to the image forming apparatus 20 without using the network 12 (step S102). Accordingly, it is possible to prevent increase of traffic in the network 12 due to transmission of the print job to the image forming apparatus 20, and as a result, even if the bandwidth of the network 12 is low, delays in communication in the network 12 are reduced.

In addition to transmitting the print job to the image forming apparatus 20 via the USB port (step S102), the print job transmitting apparatus 30 obtains, from the image forming apparatus 20 via the USB port, the device information of the image forming apparatus 20 (step S105). This allows for transmission of information between the image forming apparatus 20 and the print job transmitting apparatus 30 to be achieved with a simple configuration.

It is noted that the print job transmitting apparatus 30 may transmit the print job to the image forming apparatus 20 by a method in which the print job does not pass through the USB port. Similarly, the print job transmitting apparatus 30 may obtain, from the image forming apparatus 20, the device information of the image forming apparatus 20 by a method in which the device information does not pass through the USB port.

In the present embodiment, the print system 10 only includes the image forming apparatus 20 that is not connected to the network 12. However, the print system 10 may include an image forming apparatus 20 that is connected to the network 12.

When the print job is transmitted to the image forming apparatus 20 via the network 12, the print job transmitting apparatus 30 may not obtain the device information and user session information from the image forming apparatus 20 that is connected with the network 12.

When the image forming apparatus 20 connected with the network 12 ends execution of the print job received via the network 12, the image forming apparatus 20 may transmit, to the server 40 via the network 12, the device information and user session information of the image forming apparatus 20.

In the present embodiment, when the print job is transmitted from the print job transmitting apparatus 30 and received by the image forming apparatus 20, the print job is immediately executed by the image forming apparatus 20.

However, when the print job is transmitted from the print job transmitting apparatus 30 and received by the image forming apparatus 20, the image forming apparatus 20 may temporarily store the print job. Then, in response to a command received via the operation portion 21 of the image forming apparatus 20, the image forming apparatus 20 may execute the print job temporarily stored thereto.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:
1. A print job transmitting apparatus, comprising:
a processing unit;
a printer driver; and
a storage device storing a device communication program executable by the processing unit and a server communication program executable by the processing unit, wherein
the processing unit executes the device communication program to communicate with an image forming apparatus for executing a print job, the processing unit executes the server communication program to communicate with a server for managing information relating to the image forming apparatus, the device communication program transmits the print job to the image forming apparatus, determines whether or not execution of the print job by the image forming apparatus has ended, and after determining that the execution of the print job has ended, obtains, from the image forming apparatus, the information relating to the image forming apparatus by using a predetermined command, the server communication program transmits, to the server, the information obtained by the device communication program, the printer driver is configured to obtain, from the image forming apparatus, the information relating to the image forming apparatus and receive, via an operation device, a setting of whether or not to execute an information transmission process to transmit the information obtained from the image forming apparatus to the server, and in a case where it is determined that the execution of the print job has ended and the information transmission process has been set to be executed, the device communication program obtains, from the image forming apparatus, the information relating to the image forming apparatus.

2. The print job transmitting apparatus according to claim 1, wherein the server communication program transmits, to the server via a network, the information obtained by the device communication program, and the device communication program, in addition to transmitting, without using the network, the print job to the image forming apparatus, obtains, without using the network, the information relating to the image forming apparatus from the image forming apparatus.

3. The print job transmitting apparatus according to claim 2, wherein the device communication program, in addition to transmitting, via a USB port, the print job to the image forming apparatus, obtains, via the USB port, the information relating to the image forming apparatus from the image forming apparatus.

4. A print system, comprising:

an image forming apparatus configured to execute a print job;

a print job transmitting apparatus configured to transmit the print job to the image forming apparatus; and a server configured to manage information relating to the image forming apparatus, wherein the print job transmitting apparatus includes:

a processing unit;

a storage device storing a device communication program executable by the processing unit and a server communication program executable by the processing unit; and a printer driver configured to obtain, from the image forming apparatus, the information relating to the image forming apparatus and receive, via an operation device, a setting of whether or not to execute an information transmission process to transmit the information obtained from the image forming apparatus to the server, the processing unit executes the device communication program to communicate with the image forming apparatus, the processing unit executes the server communication program to communicate with the server, the device communication program transmits the print job to the image forming apparatus, determines whether or not execution of the print job by the image forming apparatus has ended, and after determining that the execution of the print job has ended, obtains, from the image forming apparatus, the information relating to the image forming apparatus by using a predetermined command, the server communication program transmits, to the server, the information obtained by the device communication program, and in a case where it is determined that the execution of the print job has ended and the information transmission process has been set to be executed, the device communication program obtains, from the image forming apparatus, the information relating to the image forming apparatus.

* * * * *